(12) United States Patent
Sagoe-crentsil et al.

(10) Patent No.: US 7,771,686 B2
(45) Date of Patent: Aug. 10, 2010

(54) HYBRID INORGANIC POLYMER SYSTEMS

(75) Inventors: Kwesi Kurentsir Sagoe-crentsil, Highett (AU); Luqian Weng, Nanjing (CN); Alan Harry Taylor, Highett (AU)

(73) Assignee: Commonwealth Scientific and Industrial Research Organisation, Australian Capital Territory (AU)

( * ) Notice: Subject to any disclaimer, the term of this patent is extended or adjusted under 35 U.S.C. 154(b) by 747 days.

(21) Appl. No.: 10/581,492

(22) PCT Filed: Dec. 2, 2004

(86) PCT No.: PCT/AU2004/001694

§ 371 (c)(1),
(2), (4) Date: May 24, 2007

(87) PCT Pub. No.: WO2005/054340

PCT Pub. Date: Jun. 16, 2005

(65) Prior Publication Data

US 2007/0275241 A1    Nov. 29, 2007

(30) Foreign Application Priority Data

Dec. 2, 2003    (AU)    .............................. 2003906679

(51) Int. Cl.
*C01B 33/32* (2006.01)
*C01B 33/00* (2006.01)
*C01B 33/26* (2006.01)

(52) U.S. Cl. .................... 423/332; 423/324; 423/327.1; 423/328.1; 423/331; 442/149

(58) Field of Classification Search ................ 423/324, 423/327.1, 328.1, 332, 331
See application file for complete search history.

(56) References Cited

U.S. PATENT DOCUMENTS 4,554,186 A    11/1985    Williams
6,179,898 B1    1/2001    Poncelet et al.

FOREIGN PATENT DOCUMENTS

JP    9-118774 A    5/1997
JP    2002-179794 A    6/2002
JP    2002-179795 A    6/2002

*Primary Examiner*—Lynda Salvatore
(74) *Attorney, Agent, or Firm*—Birch, Stewart, Kolasch & Birch, LLP.

(57) ABSTRACT

An inorganic polymer which comprises one or more organic functional groups and which has the following empirical formula: $R_m[M_2O]_x[Al_2O_3]_y[SiO_2]_zX_qPH_2O$, in which: R represents an organic functional group; M is an alkali metal; X is selected from chlorine and fluorine; m is >0; q is $\geq$0; x is from 1 to 1.6; y is from 1.0; x/y is from 1.0 to 1.6; z is from 3 to 65; z/y is $\geq$1.0; and P is from 3 to 5.

23 Claims, 2 Drawing Sheets

HYBRID INORGANIC POLYMER SYSTEMS

Figure 1:
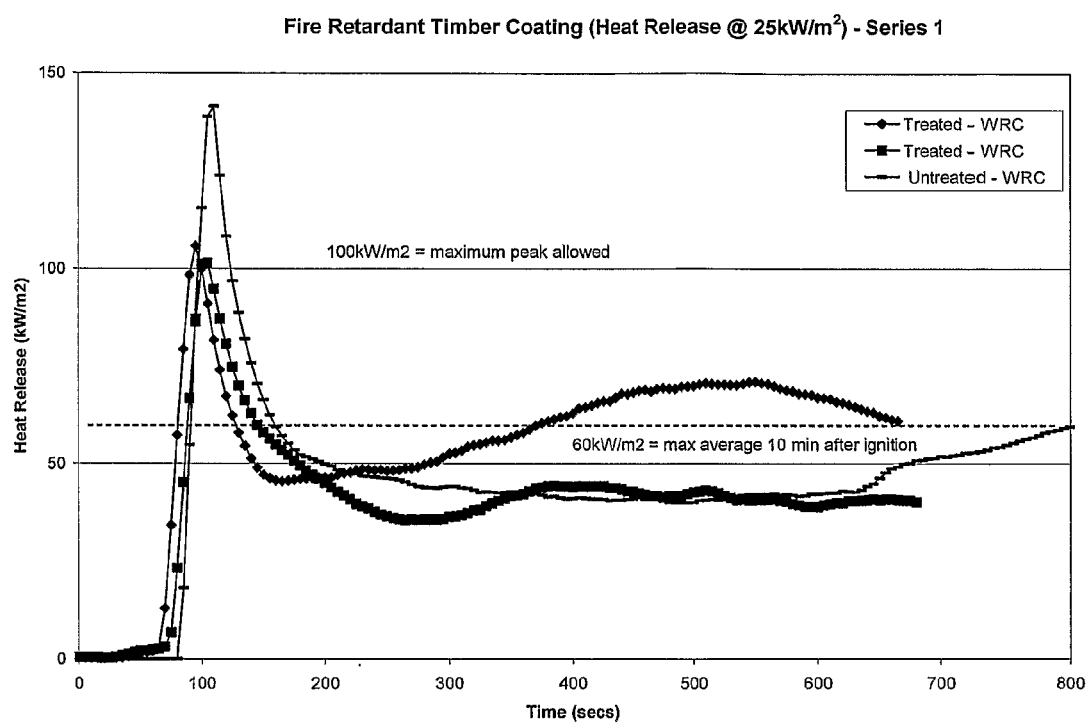

The present invention relates to Hybrid Inorganic Polymer Systems (HIPS), and more particularly to hybrid inorganic polymers that have been modified by the incorporation within their structure of organic functional groups. The present invention also relates to a process for the preparation of such modified polymers and to their use in a variety of applications.

The term "inorganic polymer" is used herein to denote a class of inorganic materials derived form the polycondensation of aluminosilicates and alkaline solutions. The inorganic polymers include Si—O—Al bonds and may be classified depending upon the three dimensional silico-aluminate structures generated. They are typically used as binders, coatings or adhesives, for example as cements.

These types of inorganic polymers exhibit characteristic properties and it would be desirable to manipulate these properties with specific end uses in mind. For instance, it would be useful to tailor such properties as toughness, elasticity, Young's modulus, adhesion, water-resistance, acid resistance, surface hardness/impact resistance and thermal and flame resistance. The present invention seeks to influence and control the physical and/or chemical properties of inorganic polymers by incorporation within the polymer structure of one or more types of organic functional groups.

Accordingly, in one embodiment the present invention provides an inorganic polymer which comprises one or more organic functional groups and which has the following empirical formula:

$$R_m[M_2O]_x[Al_2O_3]_y[SiO_2]_z X_q \cdot PH_2O$$

in which:
R represents an organic functional group;
M is an alkali metal, such as sodium, potassium or lithium;
X is selected from chlorine and fluorine;
m is >0;
q is $\geq 0$;
x is from 1 to 1.6;
y is from 1.0;
x/y is from 1.0 to 1.6;
z is from 3 to 65;
z/y is $\geq 1.0$; and
P is from 3 to 5.

Preferably, and independently, x is from 1.2 to 1.5, z is from 3 to 10 and P is from 3.5 to 5.0.

It is preferred that q >0.2.

The symbol m represents the total number of moles of organic functional group(s), R, present in the inorganic polymer of the invention. These groups R may be the same or different.

In the empirical formula given above the group(s) are usually derived from chlorine and/or fluorine containing salts. The salts may be alkali metal salts, such as sodium chloride and lithium fluoride, or alkaline earth metal salts. It may also be possible to introduce the chlorine and/or fluorine through use of silicon-containing salts, for example sodium silicofluoride.

Conventional inorganic polymers consist of chains or networks of oxygen-linked silicon atoms, with other metals (typically aluminium), replacing silicon at regular intervals within the bulk chemical structure. In the polymers of the present invention, depending on its chemistry, the organic functional group(s) R may terminate an alumino-silicate polymer chain and/or may be provided as a spacer moiety between alumino-silicate polymer chains within a network of such chains.

The organic functional group R may comprise one or more types of functional group selected from, for example, alkyl, alkylene, alkenyl, alkenylene, alkynyl, alkynylene, aryl, arylene, alkaryl, alkarylene, alkenylaryl, alkenylarylene, alkynylaryl, alkynylarylene, arylalkyl, arylalkylene, arylalkenyl, arylalkenylene, arylalkynyl and arylalkynylene. Typically, the alkyl, alkenyl and alkynyl groups and moieties will include up to 8, more particularly up to 4, carbon atoms. Examples of alkyl groups include methyl, ethyl, propyl and butyl. Examples of alkenyl groups include vinyl, 1-propenyl and butenyl. Examples of alkynyl groups include acetylenyl and propargyl. Aryl groups include phenyl and naphthyl groups. Alkyl, alkenyl and alkynyl groups and moieties may be straight- or branched-chain. The above referenced alkyl, alkenyl and alkynyl groups include the corresponding cyclic radicals, such as cyclopropyl, cyclopentyl and cyclohexyl. These organic functional groups may contain one or more hetero-atoms selected from N, O and S. Thus, the organic functional group may include one or more hydroxyl, epoxy, amino, imino, amido, imido, carbonyl and carboxyl functionalities.

The hybrid inorganic polymers of the present invention may include a variety of the same or different organic functional groups. The nature of the organic functional group will obviously depend upon the way in which it is incorporated within the overall structure of the hybrid inorganic polymer. For example, whereas an alkyl group may terminate an alumino-silicate polymer chain, an alkylene group will be required if the organic functional group is to act as a spacer between alumino-silicate polymer chains.

The chemical composition may be verified by conventional analytical techniques such as XRF, FTIR etc. It may be possible to derive information about the structure of the polymer using conventional techniques such as solid state NMR.

The polymers of the present invention are formulated with the intention of exploiting beneficial properties of both organic and inorganic polymer systems. Herein reference to the properties of the hybrid inorganic polymer means the properties of the polymer in its "as used" state. As will be explained, when formed the hybrid inorganic polymer usually takes the form of a resin. However, in use, the resin is typically cured (and hardened) and it is the properties of the polymer in this cured condition that are of primary importance. This is not to say that the properties of the resinous form of the polymer, such as its viscosity, are not important and these properties may well influence the way in which the polymer is used in practice.

A number of different classes of hybrid inorganic polymer may be prepared depending upon the nature of the organic functional group(s) which is/are incorporated within the structure of the polymer. The type and concentration of organic functional group introduced has been found to influence the properties of the resultant organic/inorganic hybrid polymer. In turn this enables the properties of the polymer to be tailored to a targeted functionality. It will be appreciated that the inorganic polymer may be modified by incorporation of the same or different organic functional group. Incorporation of different organic functional groups enables the preparation of inorganic polymers which exhibit a combination of desirable properties based on the individual types of organic functional groups (and relative proportions thereof) incorporated. This can allow more precise tailoring of the properties of the inorganic polymers of the present invention.

The exact mechanism by which the organic functional group is bound within the structure of the inorganic polymer is unclear but this is believed to be due to ionic, covalent, hydrogen bonding or Van der Waals interactions, or a combination of two or more of these, depending upon the nature of the organic functional group.

Examples of modifying reagents which may be used to introduce the organic functional group include:

1. Organic silicon-containing compounds such as silanes, silicones and polysiloxanes. Where silanes are used the modified inorganic polymer will typically have the empirical formula:

$(R^1_n SiO_{4-n})_m [M_2O]_x [Al_2O_3]_y [SiO_2]_z X_q \cdot PH_2O$ in which $R^1$ is an organic functional group, n is 1, 2 or 3 and the various other symbols are as defined above. Examples of organic functional groups $R^1$ include but not limited to alkyl (in particular $C_{1-4}$ alkyl such as ethyl, methyl, propyl and butyl), alkenyl (in particular $C_{2-4}$ alkenyl such as vinyl, 1-propenyl, 2-propenyl and butenyl), alkynyl (in particular $C_{2-4}$ alkynyl such as acetylenyl and propargyl), aryl (in particular $C_{6-10}$ aryl such as phenyl and naphthyl) and the corresponding alkaryl and arylalkyl groups. The above referenced alkyl, alkenyl and alkynyl groups include the corresponding cyclic radicals such as cyclopropyl, cyclopentyl and cyclohexyl.

Where silicones and polysiloxanes are used the modified inorganic polymer will typically have the empirical formula:

$(R^1_n Si(O)_{4-n/2})_m [M_2O]_x [Al_2O_3]_y [SiO_2]_z X_q \cdot PH_2O$ in which the various symbols are as defined above. Specific examples of modifying silicone reagents include polydimethyl siloxanes (PDMS) and polydimethoxysilanes ethoxylated dihydroxyl terminated.

2. Compounds containing specific organic functional groups. As modifying agent it is possible to use compounds which will contribute specific types of organic functional groups to the inorganic polymer. In this embodiment useful compounds tend to include polar functional groups which enable the compound to be incorporated within, and thereby modify, the inorganic polymer structure. Such polar organic compounds may include groups which are capable of forming covalent and/or ionic and/or secondary bonds during formation of the modified inorganic polymer of the present invention. Specific examples or such functional groups include phenolic, amino, amido (and polyamido), imido (and polyimido), epoxy and (meth)acrylic functional groups. These groups are believed to be incorporated into the inorganic polymer structure as spacers and/or interconnectors between aluminosilicate chains linked primarily by having secondary bonds. Specific examples of such compounds include phenolic resins such as novolak and resole resins, polyamides such as nylon-6 and nylon-66, polyimides such as acetylene-terminated isoimide resins and benzocyclobutene resins, epoxies such as epichlorohydrin and bisphenol-A derived resins, epoxy cresol-novolak resins (ECN), bisphenol F resin and cycloaliphatic epoxy resins, and (meth)acrylates such as poly(methyl methacrylate) and poly(ethyl methacrylate). Preferably, the compound is a phenolic compound.

The inorganic polymers of the present invention may be prepared by the co-condensation of an aluminosilicate, alkali polysilicate and the modifying reagent. Herein the term co-condensation refers to the process by which the various inorganic and organic components inter-react to form a hybrid inorganic polymer system. Co-condensation results in a cured product. The temperature required to effect the co-condensation will vary depending upon the reactants involved. For example, for particular combinations of reactant it may be possible to effect suitable co-condensation at room temperature, whereas for other combinations elevated temperature will be required. The temperature at which co-condensation is effected will also influence the time to achieve a fully cured product having suitable properties for the intended field of use. The temperature/time co-condensation characteristics of a given combination of reactants may influence how the combination is used in practice. Usually, the temperature required to effect co-condensation will be no more than 180° C., typically from 55 to 180° C. For polymers in accordance with the present invention where the organic moiety is phenolic in character, the temperature for co-condensation will usually be towards the upper limit of this range.

The physical form of the modifying organic reagent may also determine the way in which this co-condensation is performed. Thus, when the modifying reagent is a liquid, in a first step, the (solid) aluminosilicate species are usually dissolved in alkali polysilicate to generate a colloidal aluminate and silicate species. The modifying reagent is then added with continued mixing and the mixture is then heated (typically to a temperature from 55 to 180° C.) to initiate the co-condensation reaction. However, when the modifying organic reagent is a solid, the modifying organic reagent and aluminosilicate tend to be added to and dissolved in the alkali polysilicate prior to heating (typically at from 55 to 180° C.) to initiate co-condensation. This technique may also be used if the modifying organic reagent is a liquid. Any additional components, as described herein, may be blended with the mixture prior to heating to effect the co-condensation reaction. Co-condensation leads to formation of an aluminosilicate network incorporating organic functional groups derived from the modifying reagent. Preparation of the modified inorganic polymer may be carried out using equipment conventionally used in the preparation of inorganic polymers. It is possible to determine when the co-condensation reaction has run to completion by experimentation, for example by standard glass transition temperature (Tg) measurement.

In one embodiment heating to effect co-condensation takes place in more than one step. Here an initial heating step at relatively low temperature is employed to drive off any water present in the co-condensation mixture. Water present in the mixture prior to co-condensation can present processing problems such as delamination effects in the final cured product. The initial heating step usually takes place at a temperature of from 55 to 180° C. Subsequently, when any excess water present has been removed, a subsequent final heating step (typically from 55° C. up to about 180° C.) is effected. This multi-stage curing is usually employed when the organic compound incorporated into the inorganic polymer system is or includes a phenolic or polyimide functional group, but this may also be relevant when other types of functional group are employed. The extent of reaction can be determined as described above. The final heating step is invariably carried out at a higher temperature than the initial heating step.

Typically, the composition $\{R_m [M_2O]_x [Al_2O_3]_y [SiO_2]_z X_q \cdot PH_2O\}$ of the reactant mixture in terms of mole ratios falls within the ranges given in the following table.

| | | | | | R | |
|---|---|---|---|---|---|---|
| | $[M_2O]_x$ (M = Na, K) | $[Al_2O_3]_y$ | $[SiO_2]_z$ | $X_q$ (X = Cl, F) | Organic silicon-containing compound | Other organic compound |
| Molar ratio | 1.0~1.6 | 1.0 | 3.0~65.0 | 0.0-20.0 | — | |
| Percentage (%) | | | 80~99.9 | | 20~0.1 | — |
| | | | 10~99 | | — | 90~1 |
| | | | 10~99 | | 5-0.1 | 85~1 |

In the table given the range for q may be 0.2-20.0.

The feedstocks for the reaction are commercially available or may be made by the application or adaptation of known techniques. As a source of aluminosilicate naturally occurring or synthetic solid silica-rich aluminosilicates may be used. Examples include calcined clays (e.g. metakaolin), fly ash produced from coal-fired power stations, pulverised slag, for example from metal smelting operations, such as blast furnace slag, mining or mineral processing waste materials, such as red mud from alumina processing. Alternatively, the aluminosilicate may be prepared from a polyhydroxy-alumino-silicate according to conventional techniques. Useful modifying reagents are commercially available or may be made by the application or adaptation of known techniques.

If the organic functional group includes repeat units each of which is capable of forming a bond with an aluminosilicate chain, networks of crosslinked chains may result. This is illustrated schematically below where the modifying reagent includes phenolic repeat units:

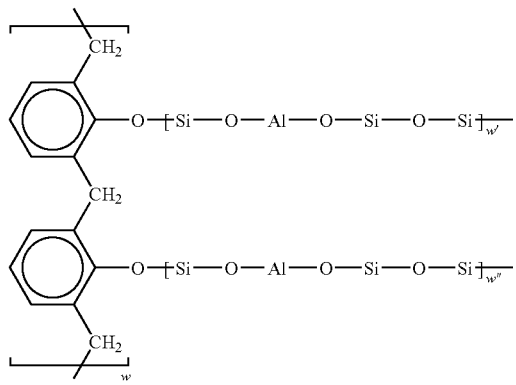

in which w, w' and w" represent the degree of polymerisation. Typically, and independently, w, w' and w" are each 35 or less.

The product of the co-condensation reaction is a material that in use has enhanced properties compared to conventional (unmodified) inorganic polymer systems. The introduction of organic functional groups into the polymer structure enables the properties of the end product to be tailored to the intended application of the polymer. The properties of the modified inorganic polymers tend to be a combination of those pure inorganic and organic materials.

As explained, the components used to produce the hybrid inorganic polymers of the present invention are intimately mixed (to form a slurry) prior to co-condensation, possibly at elevated temperature. Initially, immediately after mixing the slurry has a viscosity of about 350-500 centipoise (at room temperature). Aging of the slurry tends to result in an increase in viscosity. Typically, the maximum viscosity achieved by the slurry (assuming co-condensation has not taken place to any significant extent and excluding any functional additives that may be added prior to use) will be of the order of 1500-2500 centipoise (at room temperature). Generally, during use and after suitable application or impregnation of a treatment composition comprising the hybrid inorganic polymer components, the composition (or rather the polymer components) is cured to effect co-condensation. As noted, this is usually achieved by subjecting the composition to elevated temperature. The time required to effect curing may vary between compositions depending upon the polymer components and the context in which the composition is used. For a given composition and context of use, the appropriate conditions (temperature and time) to achieve an adequate cure based on requisite properties may be determined experimentally. The mechanism by which curing takes place is believed to follow a conventional hydrolysis and co-condensation process involving oligomeric structural units produced during the dissolution (mixing) stage.

Depending upon its identity the incorporation of organic functional groups in accordance with the present invention has been found to influence such properties as toughness, Young's modulus, elasticity, adhesion, water resistance and processability. This means that the modified inorganic polymers may be used as a coating, binder and adhesive and in applications relying on hydrophobic/hydrophilic properties.

As might be expected, the nature of the organic functional group within the inorganic polymer will have an influence on its specific properties, and thus on its possible end uses. For instance, it has been found that modification of the resultant inorganic polymer with a siloxane compound can enhance the elasticity and toughness of the inorganic polymer. Inorganic polymers modified in this way would be particularly useful for use as waterproofing and/or fire resistant adhesives and coatings on a variety of substrates, such as metallic and cellulose-based materials. It has also been found that modification of an inorganic polymer by incorporation of a phenolic compound can lead to enhanced adhesive properties in the resultant product. Such modified inorganic polymers may be used as adhesives and binders for the production of composite materials (the polymer being used as a matrix material).

When fully formulated for use, the modified inorganic polymer of the present invention may include a variety of additives to impart particular characteristics. Thus, depending on the intended application, the polymer may include such additives as fillers, pigments, dyes, thixotropic and rheology modifying agents and reinforcing particles, synthetic and natural fibres and fillers, such as metal oxides, e.g. $Y_2O_3$, $TiO_2$, $ZrO_2$, $CeO_2$, $SnO_2$, $ZnO$, $Al_2O_3$, and iron oxides, carbon (fibre, flake or particles), carbides, nitrides, borides, metal powders, polymeric materials and glass such as borate glasses. Useful fillers also include silicon dioxide type fillers, and these may assist in forming a hardened product when the modified inorganic polymer is subsequently used. Particulate and fibre reinforcement may have the same result. In one embodiment, the polymer in accordance with the invention may form the matrix of a composite material containing a reinforcing material such as woven mats, non-woven mats, fibres, felts and fabrics. The incorporation of additional components may enhance the mechanical properties of the inorganic polymer and/or impart specific properties such as electrical conductivity or resistance, elastic properties, magnetic properties and optical properties. One skilled in the art will be familiar with which additives to use and the effects they impart.

The invention may also be applied to provide impregnated fibres, that is fibres that have been soaked in and thus impregnated with a hybrid inorganic polymer in accordance with the present invention. Such impregnated fibres may have enhanced properties when compared with the basic fibre component. The impregnated fibres may then be used to form a composite product with a binder resin. The binder may be the same or different hybrid inorganic polymer that is used to impregnate the fibres, or some other resin binder. In this embodiment the fibres to be impregnated are usually natural fibres.

Polymeric compounds such as polyurethanes, styrene butadiene/nitrile rubbers and poly(vinyl chloride) may also be blended with the inorganic polymer. These polymeric compounds do not tend to be incorporated within the structure of the inorganic polymer itself in the same way as the modifying reagents described. Rather, when used, the polymeric compounds tend to act as a matrix material between the polymer chains of the inorganic polymer. This in itself can lead to enhanced properties, such as flexibility, due to the presence of the polymeric compound at inter-chain locations. Obviously, the proportion of polymeric compound blended with the inorganic polymer will be influential in this respect and one skilled in the art would have no difficulty in ascertaining a suitable proportion based on the properties desired of the blended product.

Compositions comprising the requisite components to form a hybrid inorganic polymer in accordance with the invention may be used in a variety of manufacturing and processing techniques, depending upon amongst other things the intended field of use, the viscosity of the composition and the presence of any additional functional additives. Examples of suitable techniques include, but are not limited to casting, extrusion, moulding, coating (dipping, spraying, brushing).

The modified inorganic polymers of the present invention may be used in a variety of applications depending upon their properties, as described herein. Broadly speaking, the HIPS of the invention may be used as an adhesive or coating, or as a binder in manufacturing and processing technology.

In adhesive and coating applications the HIPS resin product is applied to the surface of one or more substrates and cured by elevated temperature or a combination of pressure and elevated temperature. In the building products sector, the HIPS may be used to produce laminates and plywoods, and to bond a variety of materials together. The HIPS may be used on, for example, timber, timber-based products and metals (e.g. steel). One useful application of the HIPS resin of the invention may be in the manufacture of wooden furniture. Conventionally, the joints in furniture may be bonded using phenolics adhesive. However, these tend to be expensive and have a high volatiles content leading to safety implications. In contrast, HIPS resins in accordance with the invention may be employed with similar or even superior bonding performance and with associated benefits of reduced cost and reduced volatiles content. In use the HIPS resin adhesive is applied conventionally and then subjected to an elevated temperature cure to effect bonding of surfaces, as required.

Also in the area of building/construction, the present invention may be applied to provide a variety of products having high temperature stability and flame/fire resistance. These desirable properties may be achieved by using the polymer in accordance with the present invention as a binder in a composite product and/or by use of the polymer in a flame/fire resistant coating as described herein. It is envisaged that this aspect of the invention may be applied to produce fire-proof ducting and in walling applications.

In the electrical/electronics industry the HIPS may be used to manufacture circuit boards and electronic components, such as semiconductors. The use of the HIPS to manufacture circuit boards (under high pressure and temperature) results in a rigid product having good electrical, temperature and corrosion resistance, and good dimensional stability. The HIPS may therefore be used in place of conventional materials such as epoxies, polyesters, melamine, phenolics, polyimides and Teflon. Resin/slurry (containing the HIPS components) may be applied using conventional tools and methods as for organic resins eg epoxy. It has been found that manipulation of the relative proportions of organic and inorganic constituents enables the properties of the resultant HIPS to be controlled. For example, it may be possible to control the thermal, chemical and/or water resistance as well as mechanical, electrical and/or adhesive properties.

When used as a binder the HIPS components are blended with a functional additive, which may be a powder, granule or fibrous material, shaped and then cured by the action of heat, or a combination of heat and pressure, to form a monolithic product. During curing co-condensation reactions result in formation of a thermally stable composite product. The thermal stability of such composite products may be enhanced by inclusion of functional additives that have good high temperature stability (oxidation resistance). Such additives include natural fibres and graphite, for example. The nature of the functional additive and the proportion included in the composite will dictate the end use of the composite. Typical uses of such composites include automotive, rail, marine and aviation products such as brake and clutch components, engine moulds, tyres and lining materials (such as vehicle cockpit linings, parcel shelves etc). Such linings typically use paper or natural or synthetic materials (e.g. cotton, glass) in fibre or yarn form, as the additive. The HIPS may also be used to form foundry moulds for high temperature casting applications. For instance, the kind of HIPS described in Example 2 below may be used as a binder to form a foundry mould. Here the HIPS components are blended with a suitable refractory material such as sand and, optionally, additional foundry additives. The HIPS is then moulded to the desired configuration and cured (a multi-stage cure is likely to be employed).

Phenolic-based HIPS in accordance with the invention are also particularly well suited to manufacture of automotive, rail and aviation components such as brake pads and clutch linings. Here the HIPS resin is used as a binder material and blended with appropriate functional additives. An initial low temperature cure may be employed to drive off water followed by a final cure at a temperature of between 55 and 180° C. Alternatively, a single hot press forming and curing operation may be employed with water being driven off as part of the heating process.

In an embodiment of the present invention it has been found that hybrid inorganic polymer resins in accordance with the invention may impart enhanced fire and flame resistance when applied to timber. The exact mechanism by which these desirable properties are achieved is not understood. However, without wishing to be bound by theory, the following is offered as a possible explanation.

When wood is exposed to a naked flame volatile and combustible substances present in the wood are released and these contribute to flame ignition and propagation. This results in a rapid and significant release of heat (see the examples also). However, when the wood is coated with an hybrid inorganic polymer in accordance with the invention (or rather a composition comprising the polymer), release of volatile substances in the wood is inhibited with the result that flame propagation (and thus burning of the wood) is reduced. In other words, the hybrid inorganic polymer is believed to seal in the wood those volatile substances that contribute to (fuel) flame propagation. It is also believed that the HIPS coating may provide intumescent properties derived from the inorganic polymer backbone structure which both insulates timber and suppresses flammability.

In this embodiment the beneficial effect of the hybrid inorganic polymer relies on there being a suitably high bond between the resin and the wood at the interface of the two. If the resin became easily detached from the wood to which it is applied, it is likely that the resin will be dislodged and the intended sealing effect lost. The organic character of the hybrid inorganic polymer resin is believed to be significant in achieving suitable bonding to wood. Tests with conventional inorganic polymer resins show relatively poor fire and flame resistance when applied to wood and this is believed to be to a significant extent due to the essentially inorganic character of the resin and consequently poor bonding to wood.

Even though the hybrid inorganic polymer resins of the invention include an organic component, it is not believed that this will be released from the resin when exposed to the kind of elevated temperatures encountered in a fire situation. This suggests that the organic component forms part of the structure of the polymer and is effectively chemically bonded to the structure.

In this embodiment it is envisaged that the hybrid inorganic polymer components will be formulated as a coating composition for treating timber. The coating composition is likely to contain conventional additives in this regard, as described above. For example, the coating composition may be required to be coloured and in this case nanoparticle or conventional pigments such as $TiO_2$ will be included. When including such additives, it is of course important that formation of, and the intended function of, the hybrid inorganic polymer is not degraded (to any significant extent). The same is true in respect of the various other practical applications of the polymers envisaged herein. The effect of incorporating additives, and amounts thereof, on the performance of the polymer may be assessed by experimentation.

In this particular embodiment of the invention it is important that the wood to be treated has a low water content before application of the coating composition. This is because water present in the wood can be found to disrupt the bond between the wood and the polymer, especially as water is likely to escape from the wood at elevated temperature. For this reason it is important that the wood is essentially dry (preferably less than 15% by weight water) prior to coating. Water can be removed from wood by conventional techniques such as by conditioning in a suitable environment.

For coating of wood the composition to be applied must have a suitable viscosity. If the composition is too viscous there will be minimal penetration of the surface of the wood. Some penetration is needed to achieve a good bond. If the composition is too thin (not viscous enough), it may not be possible to form a suitably thick layer on the wood surface (although this may be remedied by the application of multiple coatings). In practice the viscosity of the composition is typically will typically be of the order of 1500-2000 centipoise at room temperature. The viscosity of the coating may also influence the way in which the composition is applied to the wood. A variety of techniques may be possible here including brushing and spraying of the composition onto the wood, and dipping of the wood into a reservoir of the composition.

After the composition has been applied to the wood it is cured by exposure to elevated temperature, as described above. This results in co-condensation of the polymer-forming components and fixes the composition at the surface of the wood. Usually, the temperature will be at the order of 60° C. In view of this it is envisaged that the main application of this embodiment will be at the industrial scale where treated wood is produced in bulk. In this case curing of coated wood is likely to take place in a kiln.

This embodiment of the invention may be used to treat a variety of woods. The wood itself is likely to be pre-treated in order to provide other desirable properties, such as termite resistance. It is not envisaged that such pre-treatment will have any adverse effect on use of the polymers in accordance with the invention to impart fire/fame resistance, but this can easily be confirmed by experimental testing. Testing may also be employed to assess whether any particular resin in accordance with the invention is especially well suited for use on a particular type of wood.

It may be appropriate to apply the coating composition over the top of another coating on the wood, or to use the coating composition as an undercoat with other coatings (such as a paint or varnish) being applied over the top of it. Neither of these possibilities is believed to represent a problem in terms of compatibility but, again, this may be verified by testing. When the coating composition is applied as an undercoat, enhanced fire/flame resistance may be achieved by use of a specially formulated fire/flame resistant overcoat layer.

This particular embodiment of the invention may be of significant practical use in areas that are prone to fire. Thus, this embodiment of the invention may be applied to timber that is to be used for construction in areas that may be prone to bushfires. In Australia, at least, standards have been established to assess the performance of materials in this context (see for example, AS 3959:1999—Construction of Buildings in Bushfire-Prone Areas (Standard Australia 1999)). This embodiment may also be usefully applied in environments where there is likely to be a fire hazard, such as in laboratories, kitchens and factories.

Following on from this last embodiment, the invention may also be applied in products such as chipboard and fibre-reinforced composites where the resin in accordance with the invention acts as a binder. As well as providing excellent structural integrity and strength, use of the resin in this context is likely to confer flame/fire resistance.

For those applications where flame/fire resistance is important the polymer of the invention is usually formulated using an organic silicone-containing compound such as a silane or silanol type compound. The polymer may also contain a phenolic type compound as organic functional group.

The invention may also be applied to form laminate surfaces where individual layers (of kraft paper, for example) are bonded using an adhesive including a polymer in accordance with the present invention. Such laminates are typically used to provide work surfaces, for example in kitchens.

The following non-limiting examples illustrate embodiments of the present invention:

EXAMPLE 1

HIPS Synthesized With Poly(Dimethylsiloxane Ethoxylated Dihydroxyl Terminated)

A suspension of colloidal powders, was prepared from 60 g metakaolin, 102 g sodium silicate solution (ratio of $Na_2O$ to $SiO_2$=1:2) and 10 g of poly(dimethylsiloxane ethoxylated dihydroxyl terminated) to produce a suspension of colloidal powders. Intimate mixing by stirring of suspension may enhance association of organic and inorganic components at the molecular level. The HIPS slurry was cast into cubic shape, and cured at 85° C. The resulting samples showed good compressive strength and water resistance.

EXAMPLE 2

HIPS Synthesized With Phenolic Resin

A HIPS was prepared from metakaolin and alkaline silicate solutions as in Example 1 but with phenolic resin (aqueous phenol formaldehyde having a specific gravity of 1.2 at 25° C.) being used as the modifying reagent. The HIPS formulation was synthesised by adding 40 g phenolic resin to 60 g base inorganic formulation and mixing the slurry by stirring at 150° C. The physical characteristics of the resulting gel network depend greatly on the size of particles and extent of cross-linking prior to gelation. The HIPS slurry was applied as an adhesive and cured at 150° C. for 120 mins. The cured HIPS showed strong bonding force at both room and high temperatures.

EXAMPLE 3

Cone Calorimeter Test Results of Inorganic Polymer Coatings

This example was undertaken to examine the effect, with respect to flame/fire resistance, of coating timber with a coating composition comprising a hybrid inorganic polymer in accordance with the present invention. For comparison the effect of a coating composition including a conventional inorganic polymer was also assessed. All specimens were tested to the criteria of AS 3959:1999—Construction of Buildings in Bushfire-Prone Areas (Standard Australia 1999). Cone Calorimeter tests were done in accordance with AS/NZS 3837:1998—Method of Test and smoke Release Rates for materials and Products Using an Oxygen Consumption Calorimeter (Standards Australia 1998).

The wooden specimens (100 mm×100 mm) were conditioned at a temperature of 23±2° C. and relative humidity of 50±5% for 7 days prior to testing. This ensured that the specimens were dry. Duplicate specimens were tested at an irradiance level of 25 kW/m². Test samples involved Western red cedar (WRC) treated with a coating containing a conventional inorganic polymer (Series 1) and with a coating containing a hybrid inorganic polymer in accordance with the present invention (Series 2). The Series 2 coating was formulated in the manner described below. Uncoated WRC specimens were also tested as a control. The specimens had a timber moisture content of about 10% or less prior to application of the coating being tested.

The Series 2 coating has a resin component and organic modifying group. The resin used was Type D sodium silicate with a 13% sodium hydroxide addition by weight. The powder component was metakaolin. This was calcined at 830° C. for a period of 16 hours. The promoter was an amino silane (Z6020 in this example, commercially available from Dow Coming).

For the Series 2 coating, the amino silane was added (0.5-1.0 wt % of the resin) prior to the powder component and mixed thoroughly. The organic modifying group was absent from the coating containing the conventional inorganic polymer (Series 1). The resin/powder ratio was between 2.2 and 2.6:1 and this could be varied in order to manipulate viscosity. The coatings had the consistency of paint and were applied by brush. After coating the specimens were cured at 60-80° C. for approximately 14 hours (although 6-8 hours is sufficient for complete curing). The HIPS coating was slightly opaque in appearance, was hard with good adhesion and water resistance.

Figure 2:
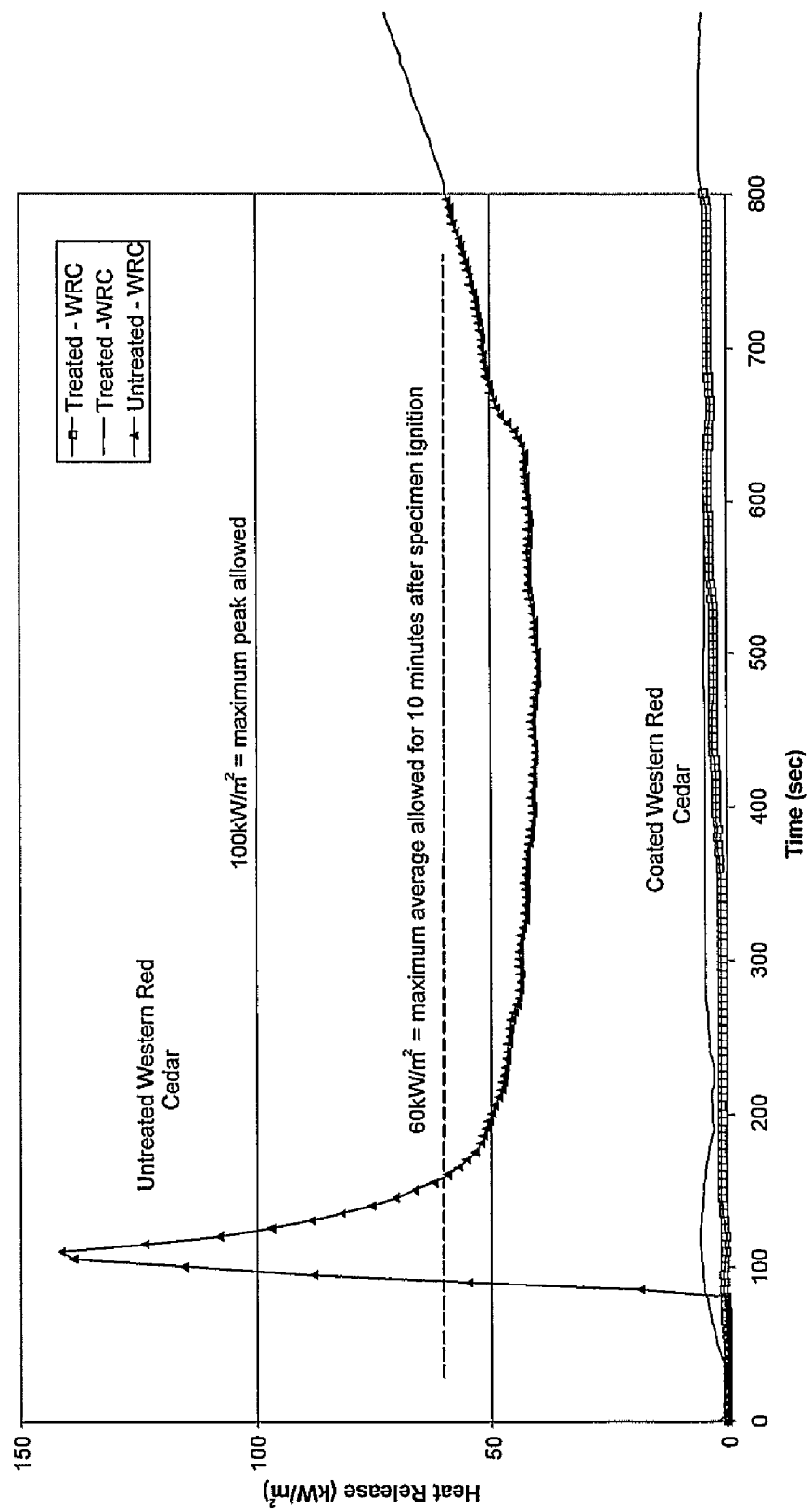

The performance of specimens relative to the requirements set out in AS 3959:1999 were determined. The results are presented in FIGS. 1 and 2 as plots of heat release against time. FIG. 1 depicts the results for untreated WRC and for specimens coated with the Series 1 coating. FIG. 2 depicts the results for untreated WRC and for specimens coated with the Series 2 coating.

The pass/fail criteria specified in AS 3959:1999 (C1 1.5.6 (b)) states "The maximum heat release rate is not greater than 100 kW/m² and the average heat release for 10 minutes following ignition is not greater than 60 kW/m² when the material is exposed to an irradiance level of 25 kw/m² and peak heat releases were greater than 100 kW/m²"

It will be seen from FIG. 1 that the untreated WRC has a characteristic profile in terms of heat release. This profile is modified slightly by use of the Series 1 coating but it will be noted that the coated specimens typically barely passed the peak heat requirement, i.e. maximum 100 kW/m², although the 10 minute heat release criteria was generally satisfied. In contrast, the Series 2 coating had a dramatic effect on the heat release characteristics of the specimen. Thus, FIG. 2 shows that this coating significantly changed the heat release profile of the WRC specimen with the result that the peak heat and overall heat release requirements of the standard were easily met. The Series 2 coating therefore provides far superior flame/fire resistance when compared to the Series 1 coating.

As explained above, the enhanced properties of the Series 2 coating are believed to be at least in part due to the bond strength of the coating to the wood. The coating is believed to remain substantially intact throughout the test and to prevent volatile and combustible substances from escaping from the wood when exposed to flame.

EXAMPLE 4

A hybrid inorganic polymer was prepared by intimate blending of the following components.

119.8 g alkali silicate/alkali hydroxide (13 wt % alkali hydroxide)

0.9 g amino silane (Z6020)

46.2 g metakaolin

The resultant resin is in a form that may be sprayed or brushed, or amenable to dipping, in order to provide coated substrates. It is envisaged that this resin may be used as is, or blended with other additives, to provide a flame/fire resistant coating for use on timber, for example.

The invention claimed is:

1. An inorganic polymer which comprises one or more organic functional groups and which has the following empirical formula

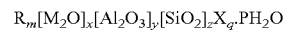

in which:

R represents an organic functional group;

M is an alkali metal;

X is selected from chlorine and fluorine;

m is >0;

q is ≧0;

x is from 1 to 1.6;

y is from 1.0;

x/y is from 1.0 to 1.6;

z is from 3 to 65;

z/y is >1.0; and

P is from 3 to 5.

2. A polymer according to claim 1, wherein, independently, x is from 1.2 to 1.5, z is from 3 to 10 and P is from 3.5 to 5.0.

3. A polymer according to claim 1, wherein q is >0.2.

4. A polymer according to claim 1, wherein the organic functional group R comprises one or more types of functional group selected from the group consisting of alkyl, alkylene, alkenyl, alkenylene, alkynyl, alkynylene, aryl, arylene, alkaryl, alkarylene, alkenylaryl, alkenylarylene, alkynylaryl, alkynylarylene, arylalkyl, arylalkylene, arylalkenyl, arylalkenylene, arylalkynyl and arylalkynylene, cycloalkyl, cycloalkenyl, cycloalkynyl, and corresponding groups containing one or more hetero-atoms selected from N, O and S.

5. A polymer according to claim 1, having the empirical formula

$(R^1_n SiO_{4-n})_m [M_2O]_x [Al_2O_3]_y [SiO_2]_z X_q \cdot PH_2O$ in which $R^1$ is an organic functional group, n is 1, 2 or 3 and the remaining symbols are as defined in claim 1.

6. A polymer according to claim 1 having the empirical formula

$(R^1_n Si(O)_{4-n/2})_m [M_2O]_x [Al_2O_3]_y [SiO_2]_z X_q \cdot PH_2O$ in which $R^1$ is an organic functional group, n is 1, 2 or 3 and the remaining symbols are as defined in claim 1.

7. A polymer according to claim 1, wherein the functional group is selected from the group consisting of phenolic, amino, amido, polyamido, imido, polyimido, epoxy and (meth)acrylic functional groups.

8. A polymer according to claim 7, wherein the functional group is derived from one or more of the following types of resin: phenolic; polyamide; polyimide; epoxy; epoxy cresol-novolak; and (meth)acrylate.

9. A polymer according to claim 1 comprising phenolic repeat units and having the following formula:

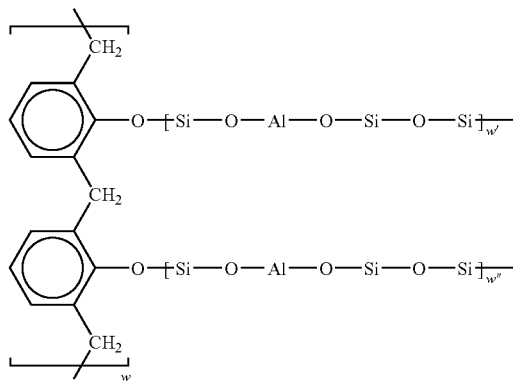

in which w, w' and w" represent the degree of polymerisation.

10. A method of preparing a polymer according to claim 1 which comprises the co-condensation reaction of an aluminosilicate, alkali polysilicate and a modifying reagent from which the one or more organic functional groups is derived.

11. A method according to claim 10, wherein the co-condensation reaction is initiated by heating at a temperature of up to 180° C.

12. A composition comprising a polymer as claimed in claim 1 in combination with one or more additives selected from the group consisting of fillers, pigments, dyes, thixotropic and rheology modifying agents, reinforcing particles, and synthetic and natural fibres and flakes, felts and fabrics.

13. A composition comprising a polymer claimed in claim 1 in combination with a polymeric compound.

14. A product formed from an inorganic polymer as claimed in claim 1, or from a composition as claimed in claim 12.

15. A product according to claim 14 wherein the product is a thermally stable composite product.

16. A product according to claim 15 which is an adhesive, a coating or a binder for use in manufacturing and processing technology.

17. A product according to claim 15 which is an automotive, rail, marine, aviation or building component.

18. A product according to claim 17, wherein the component is a brake component, a clutch component, an engine mould, a tyre or a lining material.

19. A method of improving the fire resistance of timber, which comprises applying to the surface of the timber a coating comprising an inorganic polymer as claimed in claim 1.

20. A method according to claim 19, wherein prior to application of the coating the timber has a water content of 15% by weight or less.

21. A composite material comprising as binder a inorganic polymer as claimed in claim 1 with one or more additives selected from the group consisting of a composite material containing a reinforcing material such as woven mats, non-woven mats, fibres, felts and fabrics.

22. A fibre impregnated with an inorganic polymer as claimed in claim 1.

23. A composite material comprising a binder and an impregnated fibre as claimed in claim 22.

* * * * *